United States Patent [19]

Nicely

[11] Patent Number: 5,189,801
[45] Date of Patent: Mar. 2, 1993

[54] SPEED GUIDE

[76] Inventor: Gary E. Nicely, General Delivery, Sharps Chapel, Tenn. 37866

[21] Appl. No.: 822,435

[22] Filed: Jan. 17, 1992

[51] Int. Cl.$^5$ .............................................. B43L 13/02
[52] U.S. Cl. ........................................ 33/42; 33/486
[58] Field of Search ................ 33/483, 485, 484, 486, 33/42, 43, 44, 41.5, 41.6, 41.1, 768, 770

[56] References Cited

U.S. PATENT DOCUMENTS

| | | | |
|---|---|---|---|
| 429,087 | 5/1890 | Dickins | 33/486 |
| 523,380 | 7/1894 | Snell | 33/486 |

Primary Examiner—Harry N. Haroian
Attorney, Agent, or Firm—Luedeka, Hodges, Neely & Graham

[57] ABSTRACT

A guide facilitating the movement of a carpentry tool, such as a tape rule or hand-held power saw, across an article includes a U-shaped portion which may be compressed with the fingers about an edge section of the tool and a fence portion joined to the attachment portion for sliding movement along the edge of an article. The fence portion includes a planar mid-section which may be moved in sliding engagement with the article edge and arcuate end sections positioned at opposite ends of the mid-section for protecting the fingers used to compress the U-shaped portion from the edge of the article as the guide is moved therealong.

19 Claims, 3 Drawing Sheets

SPEED GUIDE

BACKGROUND OF THE INVENTION

This invention relates generally to carpentry accessories and relates, more particularly, to accessories used for guiding a carpentry tool along a predetermined path.

In order to mark the surface of an article, such as a board, with a line spaced a predetermined distance from an edge of the article, a carpenter will commonly hold the rule of a tape rule between the index finger and thumb of one hand adjacent the rule location corresponding with the predetermined distance. The rule is then placed upon the article so that the index finger of the hand holding the rule is placed against the edge of the article and so that the rule extends across the article surface. The rule is then drawn across the article surface as the index finger is moved in sliding engagement along the edge of the article. As the rule is drawn across the article in this manner, a pencil held in the carpenter's other hand is moved in marking engagement with the article surface adjacent the end of the rule to form the desired line upon the article surface.

Although the surface of an article may be marked in the aforedescribed manner relatively quickly, the edge of the article is likely to harm the index finger as the finger is moved therealong. This likelihood is increased if the article edge is extremely rough and/or includes splinters.

There exists devices in the prior art which may be either secured against or held in contact with a tape rule for protecting the index finger of the user as the finger is slidably moved along the edge of an article. Examples of such devices are shown and described in U.S. Pat. Nos. 928,422 and 4,890,393. However, the devices described in the referenced patents are limited in that they either do not adequately protect the user's finger during use or they increase the time required to mark an article with the rule. Still further, the devices of the referenced patents are not suitable for guiding other carpentry tools, such as a power saw, along a predetermined path.

Accordingly, it is an object of the present invention to provide a new and improved device for use when guiding a carpentry tool along the edge of an article and which provides enhanced protection for the user's fingers as the tool is guided therealong, enables the marking operation to be performed quickly and is well-suited for use with a number of carpentry tools, such as a tape rule or a power saw.

Another object of the present invention is to provide such a device which is uncomplicated in construction and effective in operation.

SUMMARY OF THE INVENTION

This invention resides in a guide facilitating the movement of a tool along the edge of an article.

The guide includes an attachment portion capable of being held with the fingers of a user and a fence portion joined to the attachment portion. The attachment portion is generally U-shaped in cross section so as to provide a U having two side members positionable on opposite sides of a section of a tool with which the guide is to be used. The side members of the guide are compressible with the fingers against opposite sides of the tool section to maintain the attachment portion in position upon the tool section. The fence portion of the guide includes means defining a plane adapted to be slidably moved along the edge of the article so that as the attachment portion is compressed with the fingers about the tool section and the plane-defining means is moved along the edge of the article, the fence portion is disposed generally between the edge of the article and the fingers of the user to thereby protect the user's fingers from the edge of the article.

DETAILED DESCRIPTION OF AN ILLUSTRATED EMBODIMENT

Figure 1:
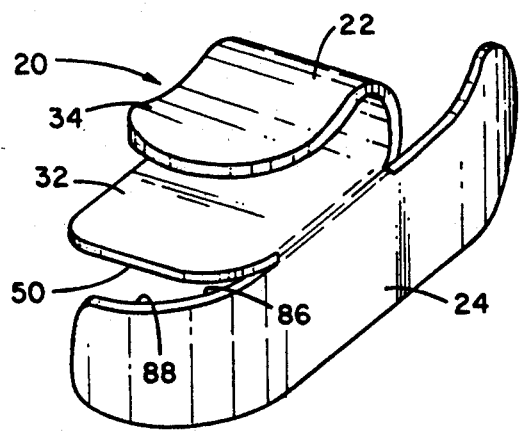
FIG. 1 is a perspective view of an embodiment of a guide within which features of the present invention are incorporated.
Figure 8:
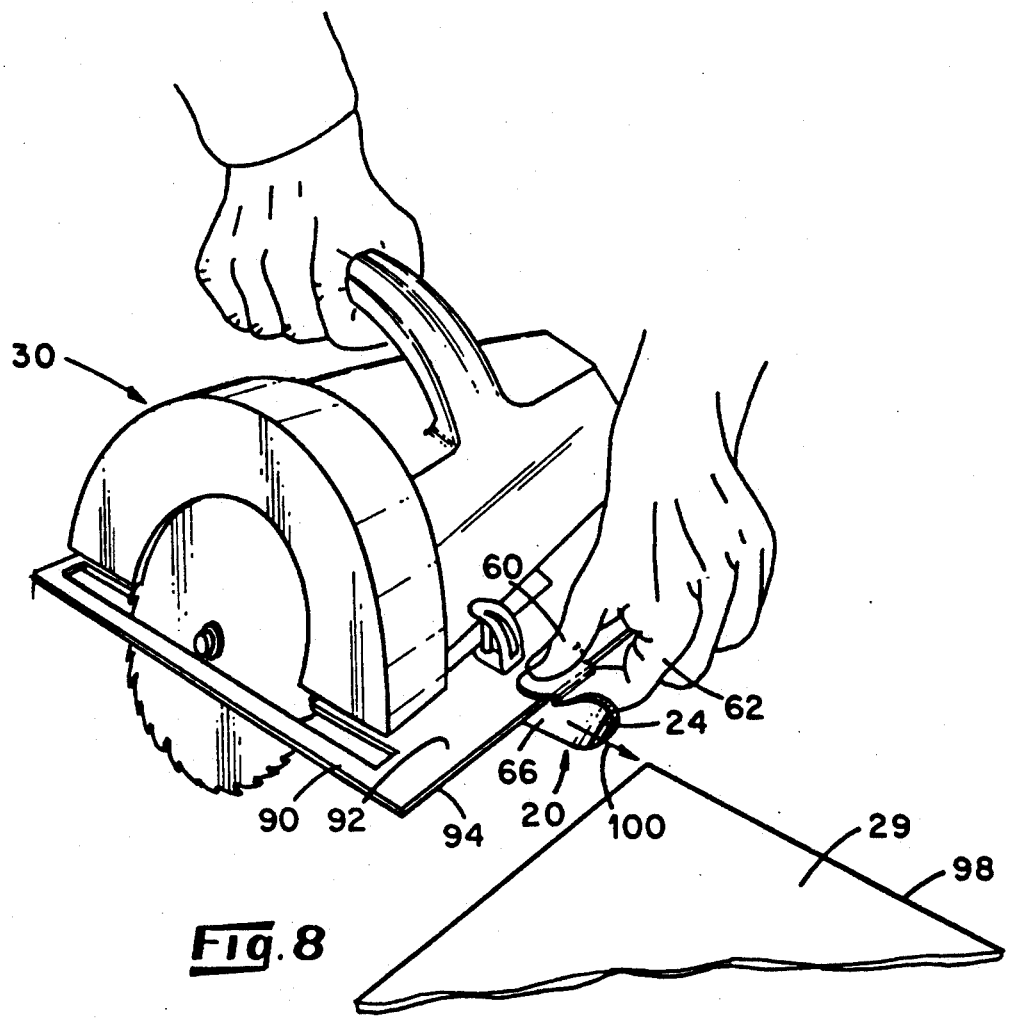
FIG. 8 is a perspective view illustrating the use of the FIG. 1 guide with a power saw.

Turning now to the drawings in greater detail and considering first FIG. 1, there is illustrated an embodiment, generally indicated 20, of a guide for use when guiding various carpentry tools along an article. The guide 20 includes an attachment portion 22 which is maintained with the user's fingers about a preselected section of a tool with which the guide 20 is to be used and includes a fence portion 24 joined to the attachment portion 22 for sliding movement along the edge of the article. As the guide 20 is moved along the article edge, the guide 20 protects the user's fingers from harm which could otherwise result as the fingers are slidably moved along the article edge. As will be apparent herein, the guide 20 is well-suited for use with the rule 25 (FIGS. 4–6) of a tape rule 26 as the rule 25 is guided along an edge of an article 28 (FIG. 6) to be marked but may also be used when guiding other tools, such as a power saw 30 (FIG. 8), along the edge of an article 29. Accordingly, the principles of the present invention may be variously applied.

Figure 2:
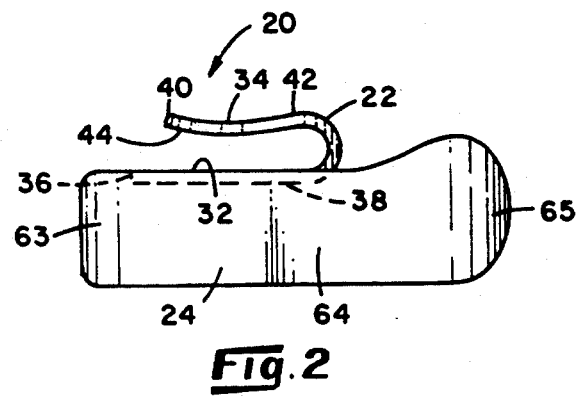
FIG. 2 is a side elevation view of the FIG. 1 guide as seen generally from the right in FIG. 1.

With reference to FIGS. 2-5, the attachment portion 22 is generally U-shaped in cross section and includes two side members 32, 34 which provide the legs of the U of its U-shape. As best viewed in FIG. 2, one side member 32 is generally planar in form and has two opposite ends 36, 38. The planar side member 32 is provided with two substantially straight and parallel edges 46, 48 and an arcuate edge 50 corresponding with the member end 36 and extending between the substantially straight edges 46, 48. The other side member 34 is somewhat S-shaped as illustrated in FIG. 2 and includes two opposite ends 40, 42. A base section 43 joins the leg member ends 38, 42 together at the base of the U, and the opposite leg member ends 36, 40 are in spaced relation.

It is a feature of the guide 20 that the U of the attachment portion 22 accepts a preselected section of a tool directed therein, and the side members 32, 34 of the attachment portion 22 are compressible with the fingers about the tool section against opposite sides of the tool section. To this end, the spacing, indicated 44, provided between the side members 32, 34 is of sufficient size to accept a tool section within a relatively broad range of thicknesses. In the depicted embodiment 20, the spacing 44 is adapted to accept the edge 94 (FIG. 8) of the table of a portable saw 30 directed edgewise therein. Accordingly, the ends 36, 40 of the side members 32, 34 may be spaced apart by a distance of at least 0.125 inches. As will be apparent, the U of the attachment portion 22 also provides means for hooking the guide 20 about the belt or pocket of the user until needed.

Figure 4:
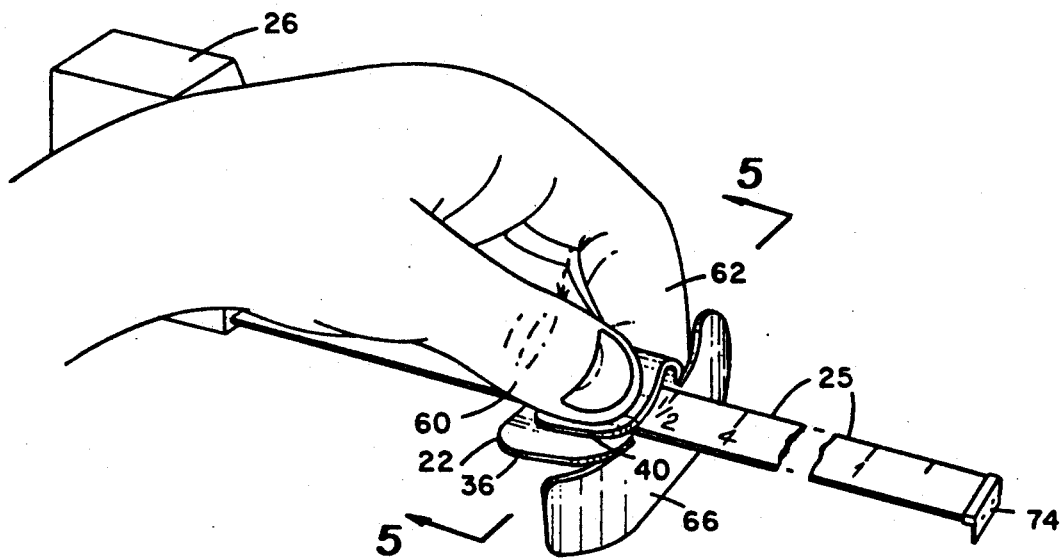
FIG. 4 is a perspective view illustrating the FIG. 1 guide when held about the rule of a tape rule.
Figure 5:
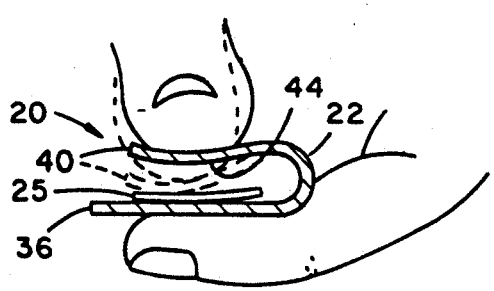
FIG. 5 is a cross-sectional view taken generally about line 5—5 of FIG. 4.

In use, the side members 32, 34 are compressed between the thumb 60 and index finger 62 of the user's hand as illustrated in FIGS. 4 and 5. Preferably, each side member 32, 34 is of sufficient size so that when compressed in the aforedescribed manner, the thumb 60 and index finger 62 are not required to directly contact the surface of the tool section about which the attachment portion 22 is positioned. Furthermore, it is preferred that the ends 36, 40 of the side members 32, 34 are resiliently biased away from one another when the ends 36, 40 are compressed in engagement with the opposite sides of the tool section. Therefore, upon compression of the attachment portion 22 about a tool section, such as the rule 25 of FIG. 5, the side member end 40 moves toward the side member end 36 from the position shown in solid lines in FIG. 5 to the position shown in phantom in FIG. 5, and upon subsequent release of the attachment portion 22 from its compressed condition, the side member end 40 moves away from the side member end 36 from its FIG. 5 phantom-line position to its FIG. 5 solid-line position. If desired, the attachment portion 22 may be constructed of a resilient material, such as spring steel or plastic, so that when the side member ends 36, 40 are moved toward one another, the memory of the attachment portion material biases the ends 36, 40 away from one another.

With reference again to FIG. 2, the fence portion 24 includes an elongated strip 58 including two opposite end sections 63, 65 and a mid-section 64 disposed between the end sections 63, 65. As best viewed in FIG. 3, the mid-section 64 is substantially planar so as to provide a side surface 66 oriented in a plane 68. It is a feature of the guide 20 that the side surface 66 of the mid-section 64 is adapted to be slidably moved along a straight edge of an article and is of sufficient length as measured between its ends to reduce the likelihood that the fence portion 24 will experience rocking motion as it is slidably moved along the article edge. Accordingly, the material out of which the fence portion 24 is constructed is relatively durable and strong enough to resist damage which could otherwise result from any roughness or splinters provided along the article edge. By way of example, the fence portion 24 may be constructed of a hard plastic or steel, and the mid-section 64 is about 0.75 inches long as measured between the end sections 63 and 65.

Figure 3:
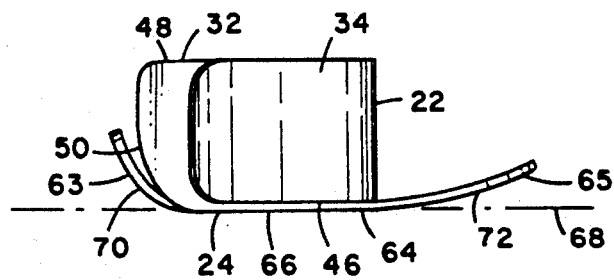
FIG. 3 is a top plan view of the FIG. 1 guide as seen generally from above in FIG. 2.

Each of the end sections 63 or 65 of the fence portion 24 is attached to a corresponding end of the mid-section 64 and includes an arcuate surface 70 or 72 which is continuous with the planar surface 66 of the mid-section 64. As best shown in FIG. 3, the arcuate surface 70 provided by the end section 63 is enlarged in size with respect to the height, as viewed in FIG. 2, of the remainder of the fence portion 24 and diverges from the mid-section plane 68 as a path is traced therealong from the mid-section 64. Similarly, the arcuate surface 72 provided by the end section 65 diverges from the mid-section plane 68 as a path is traced therealong from the mid-section 64. As will be apparent herein, the arcuate end sections 63, 65 facilitate the movement of the fence portion 24 in either of two linear directions along the edge of an article.

If desired, the guide 20 may be constructed out of a single piece of metal which has been cut and folded, where appropriate, so that the attachment portion 22 and fence portion 24 are joined as a one-piece unit. Alternatively, the guide 20 may be molded as a one-piece unit out of plastic.

Figure 6:
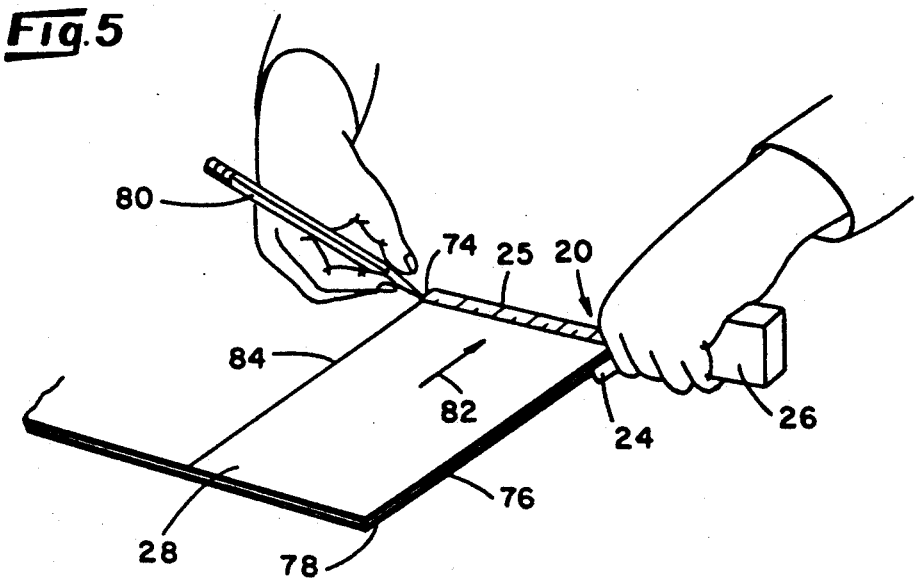
FIG. 6 is a perspective view of the FIG. 1 guide being utilized with the FIG. 4 tape rule when marking an article.

With reference to FIGS. 4-6, the guide 20 may be used with the rule 25 of a tape rule 26 to mark a line across the surface of an article 28 (FIG. 6) wherein the line is located at a predetermined distance from a straight edge of the article 28. For this purpose, the attachment portion 22 of the guide 20 is grasped between the thumb 60 and index finger 62 of the user's left hand and the U of the attachment portion 22 is directed over the edge of the rule 25 so that the rule 25 is positioned within the spacing 44 of the attachment portion 22 as shown in FIG. 5. Preferably, the thumb 60 overlies the leg 34 of the attachment portion 22 so as to engage both the attachment portion leg 34 and the surface of the rule 25 so that the user is best able to sense, or feel, any slippage between the attachment portion 22 and the rule 25. The guide 20 is then positioned along the length of the rule 25 so that the plane 68 of the fence portion surface 66 is substantially aligned with the measurement indicia of the rule 25 which corresponds with the distance from the article edge, indicated 76 in FIG. 6, at which the line is desired to be made. By way of example, there is shown in FIG. 4 a positioning of the attachment portion 22 about the rule 25 so that the plane of the fence portion surface 66 is substantially aligned with the rule indicia corresponding with 4.5 inches so that the end, indicated 74 in FIG. 4, of the rule 25 extends rightwardly from, as viewed in FIG. 4, and at generally a right angle to the fence portion surface 66.

After aligning the fence portion surface 66 with the desired indicia of the rule 25 as aforedescribed, the attachment portion 22 is compressed between the thumb 60 and index finger 62 so that the side member end 36, 40 are pressed against the opposite sides of the rule 25 so that the guide 20 is maintained in its desired position along the length of the rule 25 by, for example, the compressive forces exerted upon the rule 25 through the side members 32, 34 and by the frictional engagement between the contacting surfaces of the side members 32, 34 and rule 25. The guide 20 and rule 25 are then placed adjacent the article 28, which in the illustrated example of FIG. 6 is a board, so that the planar surface 66 of the fence portion 24 flatly engages the article edge 76 adjacent one end, indicated 78 in FIG. 6, and the end 74 of the rule 26 overlies the article surface. With a pencil 80 held within the user's right hand adjacent the rule end 74, the rule 25 is drawn across the article surface in the direction of the FIG. 6 arrow 82 while the fence portion 24 is slidably moved along the article edge 76 so that the fence portion surface 66 is maintained flat against the edge 78, and the pencil 80 is moved in marking engagement with the article surface adjacent the rule end 74. Since the rule end 74 moves along a path which is generally parallel to the straight article edge 76 as the guide 20 is moved therealong, the resultant mark, indicated 84 in FIG. 6, formed along the article surface is a straight line which is substantially parallel to the article edge 76.

When the thumb 60 and index finger 62 are operatively held about the attachment portion 22 for use of the guide 20 (and in the manner shown in FIG. 4), the fence portion end section 65 extends for an appreciable distance around a knuckle of the index finger 62. With the end section 65 extending about the knuckle of the index finger 62 as aforedescribed, the finger 62 is protected from splinters or roughness which may exist along the article edge 76 as the guide 20 is slidably moved therealong in the direction of the FIG. 6 arrow 82. In addition, the enlarged surface 72 of the end section 65 protects the thumb 60 from harm from the article edge 76 a the guide 20 is moved therealong in the direction of the FIG. 6 arrow 82. Similarly, the fence portion end section 63 extends for an appreciable distance around the tip of the index finger 62 when the guide 20 is held in the manner illustrated in FIG. 4. With the end section 65 extending about the tip of the index finger 62 as aforedescribed, the tip of the finger 62 is protected from harm from the article edge 76 as the guide is slidably moved therealong in the direction opposite that of the FIG. 6 arrow 82. Therefore, the fence portion 24 protects the index finger 62 of the grasping hand as the guide 20 is moved in either of two linear directions along the article edge 76 and is advantageous in this respect.

Figure 7:
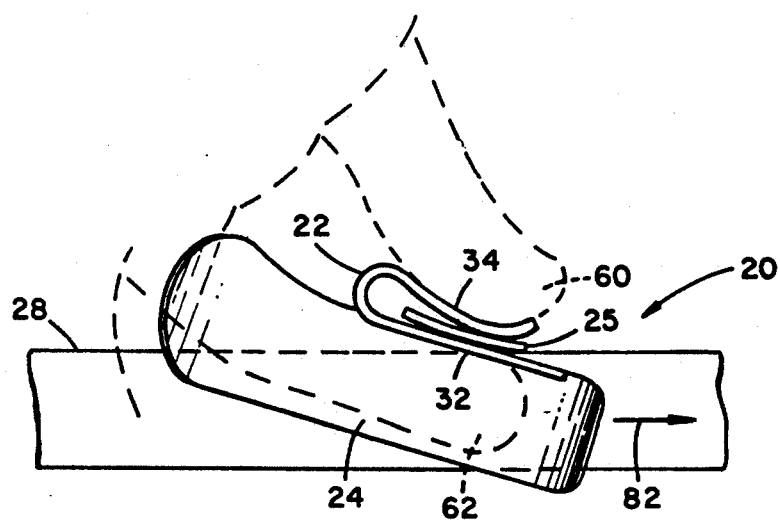
FIG. 7 is a side elevation view of the FIG. 1 guide illustrating one disposition of the guide when positioned adjacent the edge of the FIG. 6 article for movement therealong.

To enhance the protection of the index finger 62 as the guide 20 is moved in the direction corresponding with the FIG. 6 arrow 82, the guide 20 may be canted with respect to the surface of the article 28 as illustrated in FIG. 7 to reduce the likelihood that splinters or the like may be caught between the gap, indicated 86 in FIG. 1, provided between the arcuate edge 50 of the planar side member 32 of the attachment portion 22 and the adjacent edge, indicated 88, of the end section 63 of the fence portion 24.

As mentioned earlier, the guide 20 may be used in connection with a portable power saw 30 (FIG. 8) when guiding the saw 30 along the edge of an article to be cut. As is common with portable power saws of this type, the illustrated power saw 30 includes a frame 90 having a table 92 with a leading edge 94. In order to guide the power saw 30 through the article 29 (i.e., a straight-edged board) of FIG. 8 along a cutting path which is spaced a predetermined distance from the board edge 98, the attachment portion 22 of the guide 20 is placed about the leading edge 94 of the power saw table 92 and positioned therealong so that the distance between the cutting path of the power saw blade and the plane of the fence portion surface 66 corresponds with the desired distance between the board edge 98 and the desired path of cut through the board 96. The guide 20 is thereafter held in position about the table 92 as the attachment portion 22 is compressed therebout between the thumb 60 and index finger 62 of the user's left hand. The power saw 30 is then guided into cutting engagement with the board 29 as the fence portion 24 of the guide 20 is slidably moved along the edge 98 of the board 29 in the direction of the arrow 100. It follows that as the fence portion 24 is maintained in engagement with the board edge 98 as the saw blade is moved in cutting engagement with the board 29, the path of movement of the saw blade is substantially parallel to the board edge 98.

For exemplary purposes, a guide 20 may possess the following dimensions. The width of each of the side members 32, 34 of the attachment portion 22 is about 1.0 inches, the length of the planar side member 32 as measured between its ends 36, 38 is about 1.125 inches, the length of the side member 34 as measured between its ends 40, 42 is about 0.625 inches, the overall length of the fence portion 24 is about 2.375 inches, the length of the mid-section 64 is about 0.75 inches in length and about 0.625 inches in height. The spacing 44 as measured between the side member ends 36, 40, prior to compression, is about 0.125 inches.

Figure 9:
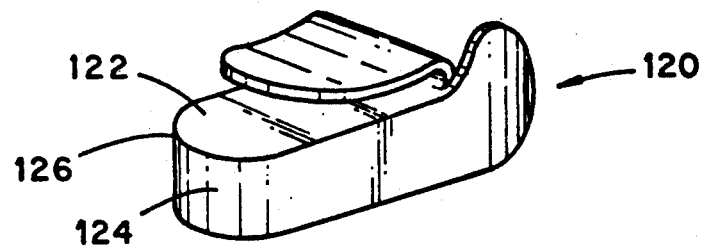
FIG. 9 is a perspective view of an alternative embodiment of a guide within which features of the present invention are incorporated.

It will be understood that numerous modifications and substitutions may be made to the aforedescribed embodiment without departing from the spirit of the invention. For example, although the guide 20 has been shown and described as including a side member edge 50 and an adjacent end section edge 88 which are separated by a gap 86, a guide in accordance with the broader aspects of the invention may possess such edges which are attached together. For example, there is illustrated in FIG. 9 an alternative guide 120 having a planar member 122 and a fence portion end section 124 which are attached together along an arcuate corner edge 126. The guide 120 of FIG. 9 therefore does not possess the gap 86 (FIG. 1) provided in the guide 20 of FIGS. 1-8. Accordingly, the aforedescribed embodiment is intended for the purpose of illustration and not as limitation.

I claim:

1. A guide facilitating the movement of a tool along the edge of an article wherein the tool has a preselected section having two opposite sides which extend toward and terminate along a linear edge and the preselected section is arcuate in shape as a path is traced across the preselected section in a direction which is substantially normal to the linear edge, the guide comprising:

an attachment portion being U-shaped in cross section so as to provide a U having two opposite side members positionable on opposite sides of the preselected section of the tool with which the guide is to be used, at least one of the side members of the U having an arcuate portion which is shaped generally complimentary to that of the preselected section of the tool when the U of the attachment portion is positioned thereabout, the side members being compressible with the fingers of a user against the opposite sides of the preselected tool section so that an appreciable amount of the surface area of said one side member contacts a surface of the preselected tool section to maintain the attachment portion in a fixed position upon the tool section during use of the guide, and a fence portion joined to the attachment portion including means defining a plane adapted to be slidably moved along the edge of the article so that as the attachment portion is compressed about the tool section with the fingers as aforesaid and the plane-defining means is slidably moved along the edge of the article, the fence portion is disposed generally between the edge of the article and the fingers of the user;

the attachment portion being constructed of a resiliently flexible material and the side members of the U of the attachment portion being joined by a bend which is devoid of sharp corners to accommodate a flexing of the side members between a flexed condition at which the space provided between the side members accepts a tool section having a thickness, as measured between the two opposite sides thereof, within a broad range of thicknesses and a compressed condition at which the side members are firmly compressed against the opposite sides of the tool section.

2. The guide as defined in claim 1 wherein the U of the attachment portion is sized to accept a tool section within a relatively broad range of thicknesses.

3. The guide as defined in claim 1 wherein the U of the attachment portion has two opposite side members which are joined together along the base of the U and which include a pair of ends which are biased away from one another upon compression of the side member ends together so that compression of the attachment portion with the fingers about the tool section moves the ends of the side members toward one another and subsequent release of the attachment portion permits the ends of the side members to move away from one another.

4. The guide as defined in claim 1 wherein the width of each side portion is sufficient so that the fingers pressed thereagainst are not required to directly contact the tool section about which the attachment portion is positionable.

5. The guide as defined in claim 1 wherein the fence portion includes a planar section which provides the plane of the plane-defining means and an end section associated with the planar section at one end thereof for movement along the edge of an article in advance of the planar section, said end section being shaped so that when the planar section is placed against the edge of the article, the end section diverges from the article edge as a path is traced forwardly therealong from the planar section.

6. The guide as defined in claim 5 wherein the end section is a first end section and the guide includes a second end section associated with the planar section at the end thereof opposite the one end, the second end section being shaped so that when the planar section is placed against the edge of the article, the second end section diverges from the article edge as a path is traced rearwardly therealong from the planar section.

7. The guide as defined in claim 1 wherein the U of the attachment portion has a generally planar side member and is joined to the plane-defining means of the fence portion along a right angle.

8. The guide as defined in claim 7 wherein the planar side member is joined to the plane-defining means of the fence portion along a substantially straight edge and includes an arcuate edge joined to and continuous with the straight edge, and the fence portion includes a planar section providing the plane of the plane-defining means and an arcuate end section associated with one end of the planar section which extends from the planar section and generally along the arcuate edge of the planar side member.

9. The guide as defined in claim 8 wherein the arcuate end section of the fence portion is attached to the planar side member along the arcuate edge thereof.

10. A guide for use when moving a carpentry tool along a desired path across an article wherein the desired path of tool movement is generally parallel to the edge of the article and the carpentry tool has a preselected section having two opposite sides which extend toward and terminate along a linear edge and the preselected section is arcuate in shape as a path is traced across the preselected section in a direction which is substantially normal to the linear edge, the guide comprising:

a U-shaped portion positionable about the preselected section of the carpentry tool so that the legs of the U of the U-shaped portion are positioned on opposite sides of the tool section, at least one leg of the U having an arcuate portion which is shaped generally complimentary to that of the preselected section of the tool when the U of the U-shaped portion is positioned thereabout, and the legs of the U-shaped portion being compressible about the tool section so that each leg of the U is pressed against a corresponding side surface of the preselected section and so that an appreciable amount of the surface area of the arcuate portion of said one leg contacts the corresponding side surface of the preselected tool section to maintain the U-shaped portion in a stationary condition upon the tool section during use of the guide; and a fence portion attached to the U-shaped portion for sliding movement along the edge of the article, the fence portion having an elongate planar section engagable with the article edge when the fence portion is slidably moved therealong and at least one arcuate end section joined to the planar section at the end thereof corresponding with the direction in which the fence portion is moved along the article edge, the arcuate end section extending a substantial distance around a finger of the user's hand used to compress the U-shaped portion about the carpentry tool to shield the user's finger from harm from the article the article edge;

the U-shaped portion being constructed of a resiliently flexible material and the legs of the U of the U-shaped portion are joined by a bend which is devoid of sharp corners to accommodate a flexing of the legs between a flexed condition at which the space provided between the legs accepts a tool section having a thickness, as measured between the two opposite sides thereof, within a broad range of thicknesses and a compressed condition at which the legs are firmly compressed against the opposite sides of the tool section.

11. The guide as defined in claim 10 wherein the U of the U-shaped portion is large enough to accept a tool section within a relatively broad range of sizes.

12. The guide as defined in claim 10 wherein the U of the U-shaped portion has two opposite side members which are joined together along the base of the U and which include a pair of ends which are biased away from one another upon compression of the side member ends together so that compression of the U-shaped portion with the fingers about the tool section moves the ends of the side members toward one another and subsequent release of the U-shaped portion permits the ends of the side members to move away from one another.

13. The guide as defined in claim 10 wherein the width of each side portion is sufficient so that the fingers pressed thereagainst are not required to directly contact the tool section about which the U-shaped portion is positionable.

14. The guide as defined in claim 10 wherein the U of the attachment portion has a generally planar side member and is joined to the plane-defining means of the fence portion along a right angle.

15. The guide as defined in claim 14 wherein the planar side member is joined to the plane-defining means of the fence portion along a substantially straight edge and includes an arcuate edge joined to and continuous with the straight edge, and the fence portion includes a planar section providing the plane of the plane-defining means and an arcuate end section associated with one end of the planar section which extends from the planar section and generally along the arcuate edge of the planar side member.

16. The guide as defined in claim 15 wherein the arcuate end section of the fence portion is attached to the planar side member along the arcuate edge thereof.

17. In combination with a carpentry tool which is movable across an article during use and which includes a preselected edge section which moves along an edge of the article across which the tool is moved and the preselected edge section has two opposite sides which extend toward and terminate along a linear edge and wherein the preselected section is arcuate in shape as a path is traced thereacross in a direction which is substantially normal to the linear edge, a guide comprising:

an attachment portion being U-shaped in cross section so as to provide a U having two side members positionable on opposite sides of the preselected edge section of the tool with which the guide is to be used, at least one side member of the U having an arcuate portion which is shaped generally complimentary to that of the preselected edge section when the U of the attachment portion is positioned thereabout, the side members being compressible with the fingers of a user against the opposite sides of the preselected tool section so that an appreciable amount of the surface area of said one side member contacts a surface of the preselected tool section to maintain the attachment portion in a fixed position upon the tool section during use of the guide, and a fence portion joined to the attachment portion including means defining a plane adapted to be slidably moved along the edge of the article so that as the attachment portion is compressed about the tool section with the fingers as aforesaid and the plane-defining means is slidably moved along the edge of the article, the fence portion is disposed generally between the edge of the article and the fingers of the user;

the attachment portion being constructed of a resiliently flexible material and the side members of the U being joined by a bend which is devoid of sharp corners to accommodate a flexing of the side members between a flexed condition at which the space provided between the side members accepts a tool section having a thickness, as measured between the two opposite sides thereof, within a broad range of thicknesses and a compressed condition at which the side members are firmly compressed against the opposite sides of the tool section.

18. The combination of claim 17 wherein the carpentry tool is a tape rule and the edge section of the tool about which the attachment portion is positionable is provided by an edge section of the rule.

19. The combination of claim 18 wherein the carpentry tool is a hand-held power saw having a frame with a table for movement across the article, and the edge section of the tool about which the attachment portion is positionable is provided by an edge section of the saw table.

* * * * *